Oct. 20, 1959 M. GOTTLIEB 2,909,319
ELECTROMECHANICAL SYNCHRONIZER
Filed June 13, 1955 3 Sheets-Sheet 1

INVENTOR
MARVIN GOTTLIEB
BY John L. Sterling
ATTORNEY

Oct. 20, 1959 M. GOTTLIEB 2,909,319

ELECTROMECHANICAL SYNCHRONIZER

Filed June 13, 1955 3 Sheets-Sheet 2

INVENTOR
MARVIN GOTTLIEB

BY J. L. Sterling

ATTORNEY

Oct. 20, 1959 M. GOTTLIEB 2,909,319

ELECTROMECHANICAL SYNCHRONIZER

Filed June 13, 1955 3 Sheets-Sheet 3

INVENTOR
MARVIN GOTTLIEB

BY [signature]

ATTORNEY

United States Patent Office 2,909,319

Patented Oct. 20, 1959

2,909,319

ELECTROMECHANICAL SYNCHRONIZER

Marvin Gottlieb, Philadelphia, Pa., assignor to Sperry Rand Corporation, a corporation of Delaware Application June 13, 1955, Serial No. 515,087

22 Claims. (Cl. 235—61.11)

This invention relates to data card sensing, and in particular to means for timing pulses used in the sensing of the card.

The invention, in the present disclosure, makes use of a standard punched card having data designation positions defined by the point of intersection of eighty columns extending widthwise of the card and twelve rows extending lengthwise of the card. The cards are fed, upper edge first, from a supply bin through a plurality of stations at each of which the leading edge of the card, as well as each data perforation in row by row order, is sensed. The data punched in the card is transferred, through a magnetic core memory and an encoder, to a magnetic tape in the form of coded information suitable for use in the computer as shown in an application of common assignee Serial No. 515,102 filed June 13, 1955.

A particular object of the invention is to provide a card sensing mechanism through which cards can be fed at high speed for sensing at two stations for the purpose of checking the data thereof and machine operations controlled by the card, the sensing of the card being controlled by a pulsing means which is regulated by the feed of the card through the sensing means.

A further object of the invention is to provide for the generation of a sprocket pulse for determining the proper time for reading each of the rows of punched holes in a card as it passes beneath the sensing means and for generating a set of twelve sprocket pulses, individually timed for each card, and controlled by the operation of the card feeding means.

A still further object of the invention is to provide for sprocket pulse generating in such manner that the pulse, in addition to controlling the sensing of the card can be employed in other operations such for example as counting the rows of the card as the data openings therein are sensed, and energizing certain of the core windings of a memory unit.

Other objects of the invention are to provide in a card sensing machine; a means for recording on and reading from a magnetizable member a pulse spot whereby a pulse can be transferred in synchronism with sensing and then erased; to provide a detector operated by the feed of the card so that sensing of the card can be precisely controlled; and to provide counting means for modifying the action of the card pulsing means.

The foregoing and other objects of the invention particularly relating to the details of construction and operation will become apparent from the following description read in conjunction with the accompanying drawings in which.

Figure 2:
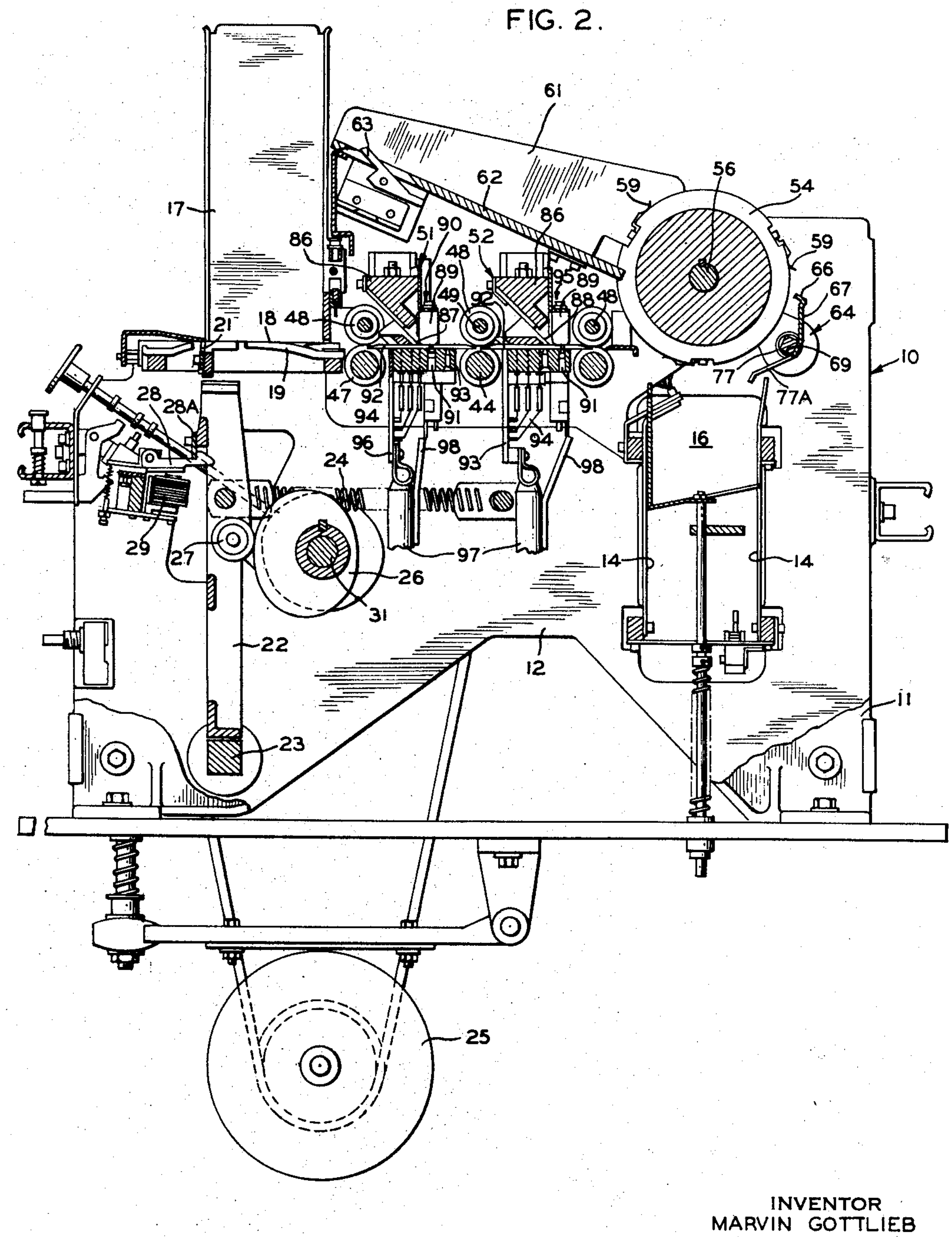
Fig. 2 is a vertical section taken through the machine from front to rear looking toward the right side of the machine and showing the arrangement of the card detector and feed rolls.

Referring to the drawings in detail and in particular to Fig. 2, a card feeding and sensing mechanism is indicated at 10 which includes right and left side frames 11 and 12, respectively, shaped to provide openings 13, for the mounting of panels 14 forming the walls of a reject or error-card pocket 16, and for the mounting of various cross shafts and bars. The cards to be fed to the machine are held in a supply or input bin 17, mounted on top of the frame at the front thereof, and are supported on a bottom grid 18 through the slots 19 of which a picker knife 21 is oscillated. The knife is adjustably attached to the upper end of a picker arm 22 mounted on a cross bar 23 pivoted in the side walls of the frame. The arm 22 is pulled forwardly by a spring 24 but controlled in its card feed and retract movements by a cam 26 against which bears a roller 27 carried on the arm 22. The cam is shaped to provide a slight overthrow in its retract movement of the arm so that a spring biased arm retaining latch 28, controlled by a magnet 29, is freed from the holding force exerted by the spring 24 on a catch 28A to operate at a predetermined time to feed a card at precisely the proper instant. The cam 26 is secured on a main drive shaft 31 which is mounted in suitable bearings in the side frames and projects therebeyond at its opposite ends.

Figure 1:
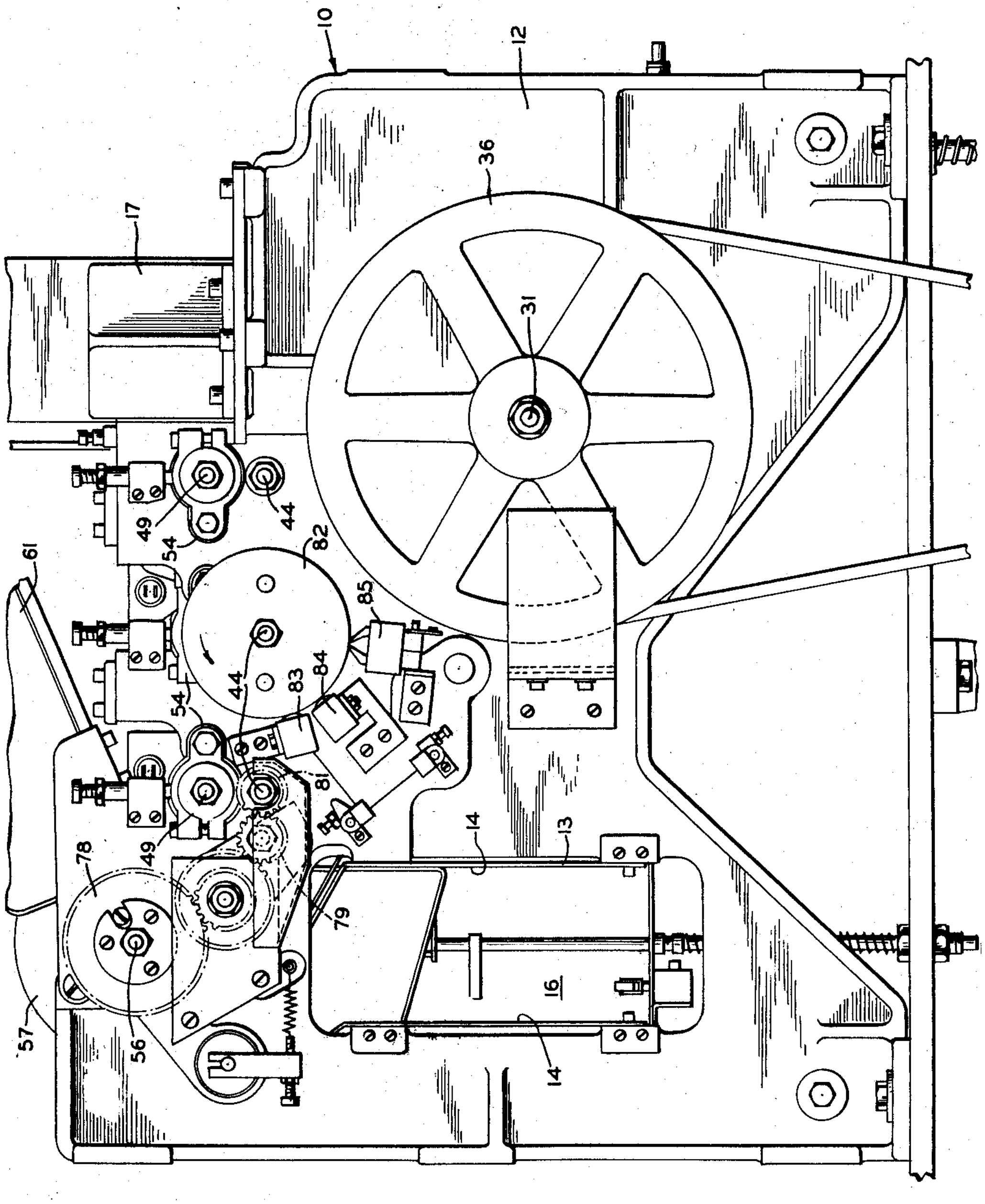
Fig. 1 is a view looking at the left side of a machine used for sensing cards and showing the location of a pulse drum associated with the card feeding means.

The end of the shaft has keyed thereto a pulley 36 driven from an adjustably mounted motor 25 by a belt while the end of the shaft, at the right side of the machine, has keyed thereto a pulley. The drive of the latter is transmitted by a suitable belt (Fig. 1) to pulleys which are secured to the ends of lower feed roll shafts 44 journalled in side bearings and mounting laterally spaced feed rollers 47 which coact with feed rolls 48 mounted on upper feed roll shafts 49. The three sets of feed rolls, driven by the pulleys, are designated as the intake, intermediate and eject rolls and are equally spaced from each other to feed record cards successively through first and second sensing stations 51 and 52 respectively, from the supply bin 17.

The upper and lower feed roll shafts are connected by meshing gears and the upper shafts are supported at their opposite ends in bearings 54 mounted for vertical adjustment on the frame. The latter also supports bearings in which rotates a drum shaft 56 to which is secured a card stacking drum 57 disposed in the median line of the machine. The drum supports, at spaced intervals on its periphery, card holding clips 59 into which the cards are forced for transfer to an output or stacking bin 61, the bottom plate 62 of which arrests the movement of the cards and thus releases them from the clips as the latter pass downwardly through suitable slots in the drum end of said bottom plate. The latter is provided with a bin switch 63 for indicating a capacity condition of the bin 61.

When, as the result of a sensing at either sensing station an error routine is inaugurated in a circuit, an error card ejector 64 is operated to swing the projecting upper ends 66 of a rock plate 67 into the path of a card carried in one set of the clips 59 to drop the error card into the error bin 16.

The lower feed roll shaft 44 for the intermediate feed rolls, disposed between the sensing stations, has secured to the extended left hand end thereof a magnetic pulse disc or drum 82 the periphery of which is coated with a magnetically susceptible material. Three magnetic heads are arranged about the periphery of the disc; a recording or write head 83, a read head 84 and an erase head 85 reading counterclockwise in Fig. 1 which is the direction in which the disc 82 and the lower feed rolls rotate in unison.

Each of the sensing stations 51 and 52 are substantially identical in structure and a description of one will suffice. The first sensing means may be referred to as the reading station while the second sensing means may be referred to as the checking station. Each station consists of a unit including a brush carrier bar 86 of dielectric material. The bottom wall of the carrier, disposed at an oblique angle, is slotted to hold eighty or more metal brushes spaced laterally to coincide with the spacing of the columns of a statistical card. The banks of brushes 87 and 88, for the first and second sensing stations, respectively, extend beyond the lower edge of the bar to wipe the card and, by applying voltage pulses, sense electrically the perforations, row by row. Each bar 86 carries at the forward center edge thereof a casing 89 in which a lamp is housed to provide a beam of light for the operation of a phototube unit 91 used to detect the leading edge of the card as it passes through and breaks the beam, the tube and lamp combinations at the first and second sensing stations being referred to hereinafter as leading edge detectors 90 and 95 respectively. Both the phototube and the brushes are included in circuits, those of the brushes being energized when a brush, extending through a card perforation, wipes a metal contact strip 92 of which there is one corresponding to each column of a card. The strips 92 are embedded in a holder of dielectric material constituting a base plate 93 disposed beneath each sensing station, the strips 92 being connected by wires 94 to a contact board 96 from the contacts of which, wires are lead, in a cable 97, to a remote plug terminal. The phototube unit 91 is connected by wiring 98 to an amplifier, included in the circuit disclosed in the application above referred to.

Figure 3:
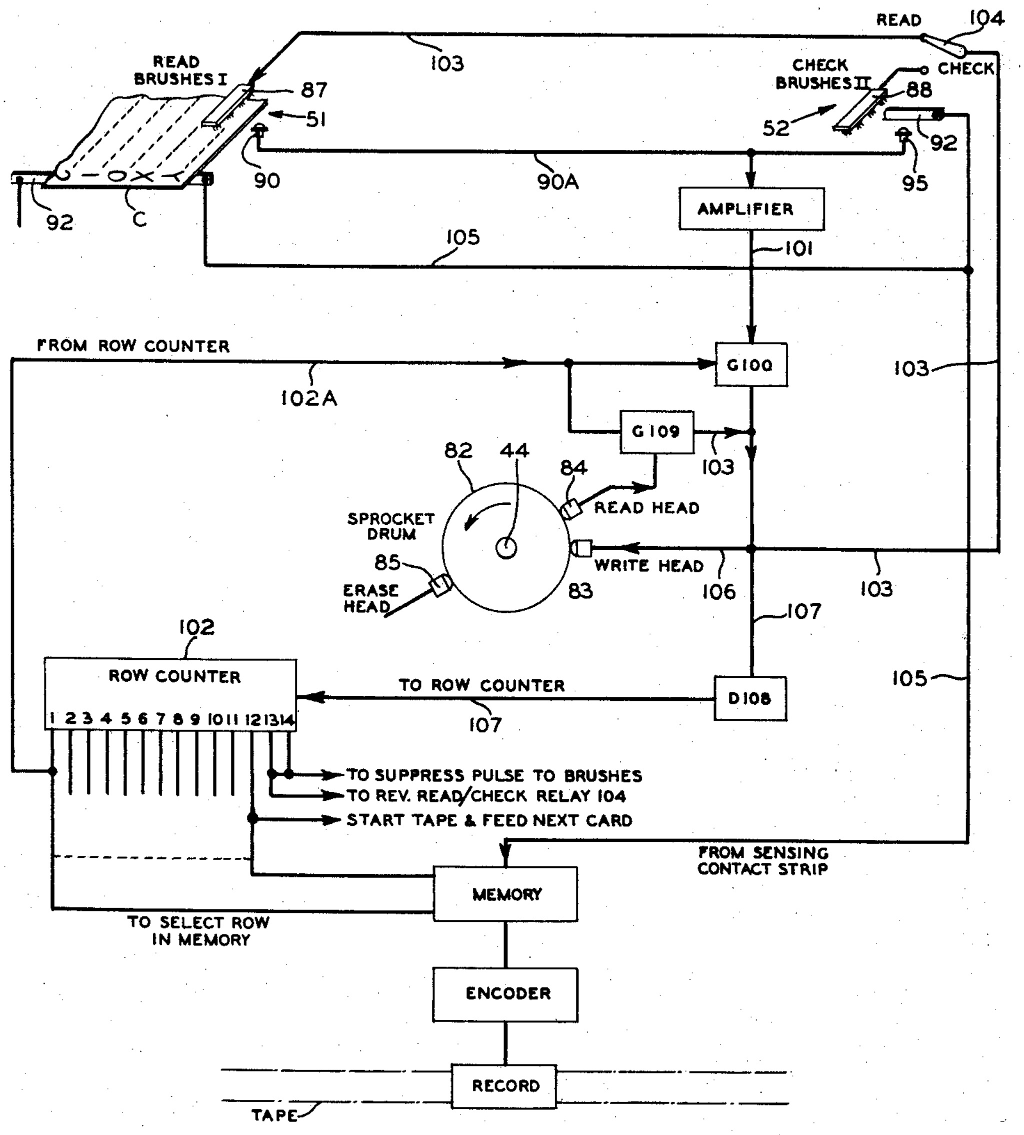
Fig. 3 is a diagrammatic illustration showing the pulse circulating path with respect to the pulse drum, the leading edge detector and the row counter.

While the present disclosure is applied to a card sensing mechanism, the principal object of the invention is to coordinate data sensing with the feed of the card C, as shown in Fig. 3. As the card is detected at the first station 51 by the leading edge detector 90 a pulse generated in the common line 90A is amplified and fed through a line 101 to the write head 83 to apply a spot in the well known manner to the surface of the pulse transfer member or drum 82. The latter being secured to shaft 44 and operating in synchronism with the feed rolls will carry the magnetic spot to the read head 84 at the same time that the feed rolls advance the card to bring a row of holes to sensing position. The leading edge of the card is sensed by the detector 90 at the same time that the brush 87 is in register with the first row of holes, and the pulse from the detector through line 101 is allowed to pass through gate G100; which was rendered permissive by a pulse via line 102A from a row counter 102 initially adjusted to row count "one" and of a type fully explained in chapter 3, pages 12–31, of Counters as Elementary Components in "High Speed Computing Devices," by Engineering Research Associates, published by McGraw-Hill Book Co., New York, N.Y. The row counter 102 consists of four binary counters which may produce as many as 16 outputs. The Card-to-Tape Converter of Serial No. 515,102 above referred to, however, requires only 14 counts and two counts are accordingly deleted. The circuitry of the row counter is designed so that deletion is best accomplished after row count six, after which, the counter resumes the counting operation until it is once more set to count one. The leading edge pulse also goes to brush 87 via line 103 and through line 106 to the write head 83. A switch 104 in line 103 is adjustable to energize brush 88 for a "checking" operation but is shown in position to energize brush 87 for a first "reading" operation, which sends data pulses through line 105 to a memory unit. The leading edge pulse also operates through line 107 and a delay component D108 to step the row counter after the brush 87 has been pulsed. The row counter uses only the trailing edge of a 2.7 millisecond pulse to step from one count to the next. The trailing edge is elected in order to allow enough time for the common brush to probe a given row and send sensed information to a corresponding row in the memory, and the write head to record the sprocket pulse on the magnetic commutator drum. The 2.7 millisecond pulse is differentiated and its trailing edge fed to D108 which holds the peaked pulse for one millisecond to permit the common brush and the write head to complete their functions, then sends it to step the row counter. With the stepping of the row counter, the leading edge of the next row on the card comes under the common brush. Also, G109, which becomes permissive when the row counter is no longer on count one, admits the read-head pulse and passes it to activate the write head 83, the common brush, and the row counter as above described. The "leading-edge" gate, G100, closes when the row counter is stepped from count one and prohibits the passage of any pulse until the row counter returns to count one. The stepping of the row counter continues until card sensing is completed. Then, the counter returns to and remains on count one as long as no leading edge pulse or any other pulse is introduced into recirculation on the magnetic commutator drum 82. After sensing of the first row, or when the counter steps to count "two" and thereafter until the card sensing is completed the gate G109 is rendered permissive and the gate G100 inhibitive so that the initial pulse is circulated by the action of the drum 82 to sense each row of holes successively and to step the row counter.

The pulse circulating through the head 83 is carried as a spot by the drum 82 to the head 84 and through line 103 to pulse the brush as each row of holes comes thereunder and through line 106 back to the head 83 for recirculation. The distance the heads 83 and 84 are separated corresponds to the distance between rows of holes in the card. By suitably adjusting the speed of the disc or drum 82 the time necessary for transfer of the pulse spot between heads could also be very closely coordinated with the time taken to feed the card from one row of holes to the next. The drum 82 with its heads 83 and 84 constitute sensing pulse circulating means timed to card travel. The pulse spot, after passing the read head, is erased by the head 85.

The row counter 102 is successively operated upon receipt of each pulse, and each of the wires from the outlets 1 to 12 thereof corresponding to the rows of the card being sensed extend to the memory unit. The outlets 13 and 14 control various machine functions as noted in Fig. 3 and, after pulse 14 is emitted, the counter returns to count "one." The construction of the binary counter is well known and is fully disclosed and illustrated in chapter 3 of High Speed Computing Devices published by McGraw-Hill Book Company, Inc. and as used herein energizes the rows of a memory unit row by row so that the columnwise data sensed and fed to the memory is deposited in the latter at the points of coincidence of the row and column pulses by energization of cores at these locations.

The machine above disclosed is particularly adapted for use in a circuit controlling the input of data on a magnetized tape for use in a high speed computer and to this end, a suitable error card control magnet is energized to operate card ejector 64 when a suitable circuit is closed due to an error detection. This is also true of the magnet 29 used in controlling the operation of the card feeding picker arm latch 28A, and in view of the application above referred to, it is not deemed necessary to further disclose the circuitry of these agents.

The invention is not to be restricted to the precise details of construction shown since various changes and modifications may be made therein without departing from the scope of the invention or sacrificing the advantages to be derived from its use.

What is claimed is:

1. The combination with a card feeding machine including means for sensing data spaced on said card and means for feeding the card to bring said spaced data in succession to the sensing means; of means for detecting a record fed to the sensing means and for pulsing a circuit including said sensing means; pulse transfer means in the circuit operated by said feeding means for synchronizing pulses fed to the sensing means when the data in each spaced position is in register with said sensing means, said transfer means operating to circulate a pulse through said sensing means independently of said circuit pulsing means.

2. The combination with a record controlled machine including circuit means for sensing spaced groups of data in the record and means for feeding the record to bring said groups successively to said sensing means; of pulse transfer means in circuit with the sensing means and operated by said feed means; a circuit pulsing detector controlled by the position of the record in the sensing means for applying an initial pulse to the transfer means and to said sensing means; and said transfer means operating to circulate the initial pulse through said sensing means independently of said circuit pulsing means.

3. The combination with a record controlled machine including pulse operated means for sensing spaced groups of data of a record and means for feeding the record to bring said groups successively into register with said sensing means; of a circuit pulsing means controlled by the position of the record in the sensing means; pulse transfer means in circuit with said sensing and pulsing means and operated by said record feeding means for synchronizing the pulsing of the sensing means when the data groups are successively in register with the sensing means, said transfer means operating to circulate the pulse from said circuit pulsing means through said sensing means independently of said circuit pulsing means.

4. The combination with a record controlled machine including pulse operated means for sensing spaced groups of data of a record and means for feeding the record to bring said groups successively into register with said sensing means; of a pulse transfer drum in circuit with the sensing means and operated by record feeding means; circuit pulsing record detector means controlled by the position of the record in the sensing means for applying an initial pulse to the transfer drum and to said sensing means; said transfer drum being adapted to synchronize the pulsing of the sensing means when the data groups are successively in register with the sensing means and being also adapted to pass the initial pulse repeatedly through said sensing means for sensing successive groups of data, independently of said circuit pulsing record detector means.

5. The combination with a statistical data card controlled machine including circuit contained means for sensing spaced rows of data of the card and means for feeding the card to bring said rows successively into register with said sensing means; of circuit pulsing card detecting means for sensing the first row of data; and means for recirculating the pulse to sense succeeding rows of data independently of said pulsing card detecting means.

6. A device as set forth in claim 5 wherein said circuit pulsing card detecting means includes a phototube and light source means for detecting the leading edge of the card when the first row of data is in register with the pulse operated means for sensing said record.

7. A device as set forth in claim 5 wherein said means for recirculating the pulse includes a pulse transfer drum having a magnetizable surface and adapted to be rotated by the card feeding means; pulse transducing means arranged in spaced relation along the periphery of said drum for applying to and reading from the drum magnetically a pulse flux representation and said transducing means being in circuit with said card sensing means.

8. The combination with a record controlled machine including first and second sensing stations each including pulse operated means for sensing spaced rows of data in a record and means for feeding the record through both stations to bring said rows successively into register with each of said sensing means; of circuit pulsing means common to both stations and controlled by the record in either station for sensing the first row of data in the corresponding sensing means; and transfer means for recirculating the pulse to sense succeeding rows of the record independently of said circuit pulsing means.

9. The combination with a record controlled machine including pulse circuit operated means for sensing columns of data in the record and means for feeding the record to bring row positions of the data columns successively into register with said sensing means; of a circuit pulsing record detecting means controlled by the position of the record in the sensing means for applying an initial pulse to the sensing means; pulse transfer means in circuit with said sensing and pulsing means and operated by said record feeding means for synchronizing the pulsing of the sensing means when the rows of data are successively in register with said sensing means; and row counting means for conditioning the circuit whereby said transfer means passes the initial pulse repeatedly through said sensing means independently of said record detecting means.

10. A machine as set forth in claim 9 wherein said record detecting means includes a phototube and light source means for detecting the leading edge of the record when the first row of data is in register with the sensing means.

11. A machine as set forth in claim 9 wherein said transfer means includes a pulse drum having a magnetizable surface; pulse transducing means arranged in spaced relation along the periphery of said drum for applying to and reading from the drum, magnetically, a pulse flux representation and said transducing means being in circuit with said card sensing means.

12. A machine as set forth in claim 11 including a head associated with said drum for erasing the flux representation after passage thereof beyond said transducing means.

13. A machine as set forth in claim 8 including means for selectively including either sensing station in circuit and a row counter controlled by the circuit pulsing means for governing the operation of said selective means at predetermined intervals.

14. The combination with a sensing pulse circuit means for sensing data in a moving record; of a record detector means for pulsing said circuit, a drum having a magnetizable surface, means for rotating the drum in synchronism with the movement of the record, pulse transducing means arranged in spaced relation along the periphery of the drum for applying to and reading from the drum magnetically a pulse flux representation and said transducing means being in said sensing pulse circuit and being adapted to recirculate a detector pulse to provide successive sensing pulses through the sensing means.

15. A device as set forth in claim 14 including gating means in the circuit and a row counter for controlling the operation of said gating means to govern the operation of said sensing pulse circuit.

16. In a record controlled machine, the combination with first and second sensing stations each including pulse operated means for sensing spaced rows of data in a record and means for feeding the record through both stations to bring said rows succssively into register with each of said sensing means; of circuit pulsing means common to both stations and controlled by the record in either station for sensing the first row of data in the corresponding sensing means; and means for recirculating the pulse to sense succeeding rows of the record independently of said circuit pulsing means.

17. In a record controlled machine of the character set forth in claim 16 wherein said pulse recirculating means includes a magnetizable surface coupled to the record feeding means and moving therewith, a first magnetic recording head for recording signals thereon in response to an operating condition of said record feeding means, a second magnetic head cooperating with said surface to receive signals recorded thereon by said first head, and means for re-recording by said first head signals received at said second head.

18. In a record controlled machine of the character set forth in claim 16 wherein said pulse recirculating means includes a record receiving surface coupled to the record feeding means and moving therewith, a first magnetic recording head for recording signals thereon in response to an operating condition of said record feeding means, a second magnetic head cooperating with said surface to receive signals recorded thereon by said first head, and means for re-recording by said first head signals received at said second head.

19. A device as set forth in claim 18 wherein said record receiving surface is a magnetic drum.

20. A device as set forth in claim 18 wherein said record receiving surface is a disc.

21. A device as set forth in claim 18 wherein said receiving surface is of web or belt form.

22. An electro-mechanical synchronizer comprising a magnetizable surface coupled to a mechanical record card feeding system and moving therewith, a first magnetic recording head for recording signals thereon in response to an operating condition of said mechanical system, a second magnetic head cooperating with said surface to receive signals recorded thereon by said first head, means for re-recording by said first head signals received at said second head and row counting means for controlling the operating condition of said system.

References Cited in the file of this patent

UNITED STATES PATENTS

| | | |
|---|---|---|
| 2,279,018 | Wolfe | Apr. 7, 1942 |
| 2,375,307 | Lake et al. | May 8, 1945 |
| 2,614,169 | Cohen et al. | Oct. 14, 1952 |
| 2,701,095 | Stibitz | Feb. 1, 1955 |
| 2,702,380 | Brustman et al. | Feb. 15, 1955 |